United States Patent
Atterton et al.

(10) Patent No.: US 6,925,054 B1
(45) Date of Patent: *Aug. 2, 2005

(54) NETWORK PATH PROTECTION

(75) Inventors: Peter John Atterton, Chelmsford (GB); Brian Michael Unitt, Bishop's Stortford (DE)

(73) Assignee: Nortel Networks Limited, St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 589 days.

(21) Appl. No.: 09/206,597

(22) Filed: Dec. 7, 1998

(51) Int. Cl.$^7$ ............................................... H04L 12/26
(52) U.S. Cl. ........................ 370/218; 370/244; 370/248
(58) Field of Search ................................ 370/216–219, 370/220, 221, 223, 224, 227, 228, 241, 244, 248

(56) References Cited

U.S. PATENT DOCUMENTS

| | | | |
|---|---|---|---|
| 4,451,916 A | | 5/1984 | Casper et al. |
| 4,680,776 A | * | 7/1987 | Ikeuchi et al. ............... 375/267 |
| 5,457,678 A | * | 10/1995 | Goeldner ..................... 370/395 |
| 5,479,608 A | * | 12/1995 | Richardson ..................... 714/4 |
| 5,517,489 A | * | 5/1996 | Ogura ........................ 370/223 |
| 5,717,796 A | * | 2/1998 | Clendening ................... 385/24 |
| 5,818,816 A | * | 10/1998 | Chikazawa et al. ......... 370/225 |
| 5,959,972 A | * | 9/1999 | Hamami ..................... 370/228 |
| 5,974,027 A | * | 10/1999 | Chapman .................... 370/228 |
| 6,067,286 A | * | 5/2000 | Jones et al. ................. 370/218 |
| 6,111,675 A | * | 8/2000 | Mao et al. ................... 359/124 |
| 6,137,774 A | * | 10/2000 | Commerford et al. ....... 370/216 |
| 6,195,330 B1 | * | 2/2001 | Sawey et al. ............... 370/220 |
| 6,202,082 B1 | * | 3/2001 | Tomizawa et al. .......... 709/201 |
| 6,256,291 B1 | * | 7/2001 | Araki ......................... 370/216 |

OTHER PUBLICATIONS

F Safaei: "A 'Fragmented' Restoration Scheme for Flat Network Architectures", IEEE Globecom 1998. The Bridge to Global Integration. Sydney, Nov. 8–12, 1998, IEEE Global Telecommunications Conference, New York: IEEE, US, vol. 6, 1998, pp. 3763–3767.

J Manchester et al: "IP Over Sonet", IEEE Communications Magazine, IEEE Service Center, Piscataway, NJ, US, vol. 36, No. 5, May 1998, pp. 136–142.

C Metz: "IP Routers: New Tool for Gigabit Networking", IEEE Internet Computing, vol. 2, No. 6, Nov. 1998–Dec. 1998, pp. 14–18.

H Adiseshu et al: "A State Management Protocol for IntServ, DiffServ and Label Switching", Network Protocols, 1998. Proceedings. Sixth International Conference on Austin, TX, USA, Oct. 13–16, 1998, pp. 272–281.

* cited by examiner

*Primary Examiner*—Hassan Kizou
*Assistant Examiner*—Saba Tsegaye
(74) *Attorney, Agent, or Firm*—Barnes & Thornburg (57) ABSTRACT

Path protection of high priority traffic is provided between network nodes in a packet network carrying lower priority traffic in addition to the high priority traffic. First and second traffic paths are provided between the nodes, the high priority traffic being allocated to the first path and the lower priority traffic to the second path. In the event of a failure or degradation of the first path carrying the high priority traffic, this traffic is switched from the first path on to the second path and the lower priority traffic is switched to the first path.

11 Claims, 4 Drawing Sheets

NETWORK PATH PROTECTION

This invention relates to methods and arrangements for providing path protection in a communications packet network and in particular to the path protection of priority traffic in such networks.

BACKGROUND OF THE INVENTION

In the past, electronics communications networks were designed to carry predominantly voice traffic. It is now commonly observed that the growth in computer data traffic far outstrips the growth in voice traffic and that the characteristics of data traffic require a different type of network from that required for voice traffic. Data traffic is characterised by transmission of packets of information, where a packet consists of a header, typically identifying the source and destination of the packet, and payload which contains the data to be transmitted. A number of protocols exist defining the format of the information packet. One well known protocol is known as Internet Protocol (IP) and is increasingly being used for data transmission between end systems. Such networks are generally referred to as connectionless networks.

A typical IP network includes a number of routers or nodes interconnected with communications links. Optical fibres are often used as the physical transmission media for these communications links. Each router examines the headers of the packets which arrive on a given communications link and makes a decision identifying which link to another router or node each packet should next traverse in order to reach its final destination. The forwarding decision is based on the contents of routing tables held locally within each router which indicate preferred routes for particular packet destination addresses. Typically, these tables are generated by a self-discovery mechanism in which each router consults neighbouring routers to establish preferred routes, and this discovery process can take many minutes in large networks.

The routing tables are refreshed periodically. The refresh mechanism allows for reconfiguration as new nodes are added to the network or as failures occur within the network. As a result, an IP network is highly resilient, although restoration of connectivity through re-routing following e.g. a communications link failure can take several minutes to achieve.

In the current ISO standard seven layer model, routers are considered to operate at layer 3, i.e. at the 'Network' layer. It is also common practice to build data networks where at least some of the packet forwarding is performed at ISO layer 2 based on layer 2 switches rather than routers.

Failures within a communications network can arise, for example, as a result of equipment failure or as a result of physical severance of the communications link e.g. through earthworks along the route.

Many present IP networks operate on a 'best efforts' basis. That is, the communications infrastructure makes no guarantees about whether a message will reach its final destination or, if it does, the length of time it will take to arrive. Whilst this is adequate for many users, some customers, particularly business customers whose profitability depends on timely and assured communications, are demanding service guarantees from their Internet service provider (ISP) and are prepared to pay a higher price for such a service. Economic considerations generally mean that ISPs cannot afford to provide such an assured path universally to all their customers, but only to those who are prepared to pay extra for the service. As a result, many systems now require at least two classes of service: a standard 'best efforts' service and a high priority service where information packets take priority over best efforts (lower priority) traffic in the event of congestion in the network and where high priority traffic continues to arrive at its destination even under failure conditions within the network. Whereas using router reconfiguration mechanisms to restore best efforts traffic may be acceptable, the delay incurred in the conventional rediscovery and rerouting mechanism is unacceptable for a high class of service traffic.

A number of mechanisms have been proposed by which the relative priority of different packets can be identified. One such mechanism, defined by the Internet Engineering Task Force is known as 'DiffServ'. Using this mechanism, a field within the packet header identifies the class of service to which the packet belongs.

In other types of communications networks, for example voice trunk networks, it is common practice to provide duplicate communication paths between node pairs so as to provide standby or protection paths for use in the event of a system fault. A system known as the Synchronous Optical Network (SONET) and a near equivalent known as the Synchronous Digital Hierarchy (SDH) are in common use in optical telecommunications networks. In a typical SONET or SDH system, a number of communicating nodes are connected in a ring wherein each node connects to exactly two neighbouring nodes. In normal use, communication between two nodes uses a defined direction around the ring (for example, along the shorter path). In the event of failure of the connection, e.g. due to equipment failure or fibre breakage along the chosen route, the signal is re-routed in the opposite direction around the ring, thus restoring the connection. Detection of the communications failure and implementation of the re-routing function is performed by the SONET system itself and is normally accomplished within 50 milliseconds. Apart from a brief interruption of service, the connected equipment at the node need not be aware that a failure has occurred and that the traffic is now traversing a different route to the same destination node.

In order to provide such duplicate paths, additional transmission capacity must of course be provisioned in the network. In most SONET systems this additional capacity is reserved for use under failure conditions and is not used to carry useful traffic in the absence of failures. Emerging SONET products allow use of such spare capacity under normal (non failure) conditions, but require more complex schemes to enable this.

In the past, traditional telecommunications companies have accepted the trade-off of spare capacity against the need to provide network resilience. More aggressive financial goals now favour the use of spare capacity to provide an additional revenue stream for the majority of time where the network is operating normally. This is a particular problem for connectionless or Internet protocol (IP) networks where only a portion of the traffic will comprise the significant revenue earning high priority traffic. The total revenues generated by this traffic may be insufficient to support the cost of conventional protection path provisioning to guarantee timely delivery of this traffic.

SUMMARY OF THE INVENTION

An object of the invention is to minimise or to overcome the above disadvantage.

A further object of the invention is to provide an improved arrangement and method for path protection of high priority traffic in a packet network.

According to a first aspect of the invention there is provided a method of path protection of high priority traffic in a packet network, the method comprising defining a protection path, and allocating low priority traffic to said protection path whenever that path is not required for said high priority traffic.

According to another aspect of the invention there is provided a method of path protection of high priority traffic between first and second network nodes in a packet network carrying lower priority traffic in addition to said high priority traffic, the method comprising defining first and second traffic paths between said nodes, allocating said high priority traffic to said first path and said lower priority traffic to said second path, and, in the event of a failure or degradation of said first path, switching said high priority traffic from said first path on to said second path and switching the lower priority traffic from said second path to said first path.

According to another aspect of the invention, there is provided a method of path protection of high priority traffic between first and second nodes in a packet network carrying lower priority traffic in addition to said high priority traffic, there being first and second traffic paths between said nodes, said paths being coupled to respective first and second ports at each said node, the method comprising; identifying said high priority traffic at said first node, transmitting said high priority traffic and said lower priority traffic from said first node to said second node via said first and second ports over said first and second traffic paths respectively, and, in the event of a failure or degradation of said first path, switching said high priority traffic from said first path on to said second path and switching the lower priority traffic from said second path to said first path.

According to a further aspect of the invention there is provided an arrangement for providing path protection of high priority traffic in a packet network carrying lower priority traffic in addition to said high priority traffic, the arrangement comprising first and second network nodes first and second traffic paths therebetween, means for allocating said high priority traffic to said first path and said lower priority traffic to said second path, and, means responsive to a loss of integrity of said first path for switching said high priority traffic from said first path on to said second path and switching said lower priority traffic from said second path on to said first path.

According to a further aspect of the invention, there is provided an arrangement for providing path protection of high priority traffic in a packet network carrying lower priority traffic in addition to said high priority traffic, the arrangement comprising first and second network nodes each having respective first and second ports coupled to respective first and second traffic paths disposed between the nodes, traffic allocation means provided at said first node for allocating said high priority traffic to said first port and said lower priority traffic to said second port, monitoring means for determining the integrity of said first path, and switch means responsive to said monitoring means for switching said high priority traffic from said first path on to said second path and switching said lower priority traffic from said second path on to said first path.

According to another aspect of the invention, there is provided a method of transporting packet communications traffic between first and second nodes in a network carrying high priority traffic and lower priority traffic, said first node having first and second output ports and second node having first and second input ports and wherein the first ports are coupled to a first path between the nodes and the second ports are coupled to a second path between the nodes, the method comprising;
at the first node, identifying the high priority and lower priority traffic, outputting the higher priority traffic at said first output port and said lower priority traffic at said second output port;
at the second node, receiving the high priority traffic at said first input port and the lower priority traffic at said second input port; and
on the first and second paths between said nodes, monitoring the integrity of said first path, and, in the event of a loss of integrity of said first path, switching the high priority traffic, output from said first output node and input to said first input node, from said first path and on to said second path.

The arrangement and method provide a simple and low cost means by which a protected path can be offered to high priority traffic whilst allowing spare capacity to be used for lower priority (best efforts) traffic in the absence of failures in the communications paths. Further, a network can be built with arbitrary physical connection topologies without incurring significant additional management complexity. Advantageously, the protection system is independent of the transmission protocols used between co-operating network nodes.

The high priority traffic may comprise voice traffic, e.g. to provide an Internet voice service. It will of course be appreciated that definition of what constitutes high priority traffic will normally be left to the network operator.

In a preferred embodiment, the technique enables a Layer 2 or Layer 3 packet forwarding device to establish the concept of a resilient circuit between itself and a network peer. This resilient circuit is applicable only to a packet stream designated as a high priority stream. In this context, a 'resilient circuit' comprises two (preferably diversely routed) physical circuits, one designated the 'protected circuit', which carries the traffic under normal operating conditions and a second 'protecting circuit' which carries traffic when the protected circuit fails. Under normal operation, the protecting circuit is fully capable of carrying traffic of a lower priority. Definition of high and lower priority traffic is left to the network operator to manage but it is assumed that the Layer 2/3 switching/routing device is capable of differentiating between higher and lower priority traffic and directing traffic to a specific egress port on the device. Protocols to enable such traffic segregation are being developed by the Internet Engineering Task Force and include methods known as Differentiated Services (DiffServ) and Multi-Protocol Label Switching (MPLS).

The protected and protecting circuits may comprise two communications links connecting communications ports on the source and destination peer entities. One of these source ports carries at least some traffic of relatively higher priority and the other carries only traffic of relatively lower priority.

Preferably the two communications links should pass along two physically diverse routes between the two communicating nodes in order to minimise the risk of simultaneous physical disruption of both links.

Advantageously there is provided at the transmitting end of the link a crossover switch which is interposed between the traffic source ports and the communications medium. The term communications medium as employed herein is understood to include the physical medium itself and optionally transducer equipment associated with impressing an information signal on the physical medium. Optionally there may also be provided at the receiving end of the link a similar crossover switch interposed between the communications medium and the destination information ports. Also provided at the receiving end are means for monitoring the quality of performance of each component communications link, means for controlling the optional crossover switch at the receiving end and means for signalling to the transmitting end information derived from the quality of performance of each communications link. At the transmitting end of the link, means are provided for receiving the signalling information and controlling the transmitting end crossover switch in response to the signalling information received.

Optionally the monitoring means may, instead of, or in addition to directly monitoring the link quality performance, have a connection to a Layer 2 or Layer 3 protocol link status indicator (where the receiving peer node is able to provide such a signal), thus providing additional protection between the router egress port and the line interface function.

The signalling means should not require integrity of a link in the reverse direction which traverses the same physical path (and any intermediate equipment) as the link it is monitoring. Preferably, status information pertaining to a given link will be conveyed using the reverse communications path associated with the other link.

In a preferred embodiment of the invention, in the absence of degradation of either communications link, the crossover switch at the transmitting end is configured to connect the information source carrying at least some information of relatively high priority to one of the communications links, designated as the protected link, and to connect the information source carrying only information of relatively lower priority to the other communications link, designated the protecting link. The optional crossover switch at the receiving end of the link is similarly configured such that the information arrives at the designated destination ports.

In the event of degradation or failure of the communications link designated to host the higher priority traffic (the protected link), the condition is detected by the monitoring means at the receiving end of the link and signalled to the transmitting end via the signalling means. In response, the switch control means at the transmitting end causes reconfiguration of the crossover switch such that the connections between the information source nodes and the communications links are interchanged. Where the receiving end is equipped with the optional crossover switch and switch control means, this receiving end switch is also reconfigured to interchange the connections between the incoming communications links and the information destination nodes. Preferably, where this optional receiving end switch is included, reconfiguration of switches at the two ends of the link should occur simultaneously.

As a result of this action, the communications path carrying information of relatively higher priority is restored immediately, now using the protecting link. The communications path carrying information of relatively lower priority in now connected via the degraded or failed link. Preferably, the co-operating nodes within the network will possess rediscovery and reconfiguration means operating at higher layers in the communications stack by which connectivity of information of lower priority can be restored over a longer time scale.

The logic associated with the decision to switch is a function of implementation but preferably will include safeguards to prevent inappropriate switching, for example during transient faults or in the unlikely event that both links are simultaneously affected by a fault or degradation. Preferably, suitable acknowledgement means is provided to indicate to a management system when switching does occur.

Following repair of the faulty link the original crossover switch configuration can optionally be restored. Alternatively, the links can be re-designated to avoid the need for a second transient break in connectivity.

In the event of degradation or failure of the link carrying information of relatively lower priority (the protecting link), no reconfiguration of the state of the crossover switch is performed.

The technique thus provides means whereby, should a fault occur in one of the duplicated communications links, traffic of higher priority is preferentially restored at the expense of traffic of relatively lower priority. Traffic of relatively higher priority is disrupted only for a minimal time. The method is relatively straightforward and cost-effective to implement. Since the system uses duplicated point to point links, the method can be applied to networks of arbitrary physical connectivity. Protection need not be provided universally throughout a network but only on those links within the network which need to support traffic types requiring restoration capability or which are at particular risk of disruption. The restoration strategy is commensurate with the different levels of service offered to different customers and the price they pay for the service. The method can be made independent of the protocols and transmission rates in use on the connection. The method can be applied to an asymmetric link, such as a video distribution network, where traffic in the two directions between a pair of peer nodes differs in volume or uses different transmission media.

In a further embodiment, the link carrying the high priority traffic may, in the absence of a fault condition, also carry lower priority traffic if capacity for such traffic is available.

A preferred use for the technique is for implementing protected communications systems including voice and data within an IP network, though other applications will also be evident to those engaged in communications system design.

BRIEF DESCRIPTION OF THE DRAWINGS

An embodiment of the invention will now be described by way of example with reference to the accompanying drawings in which.

Figure 1:
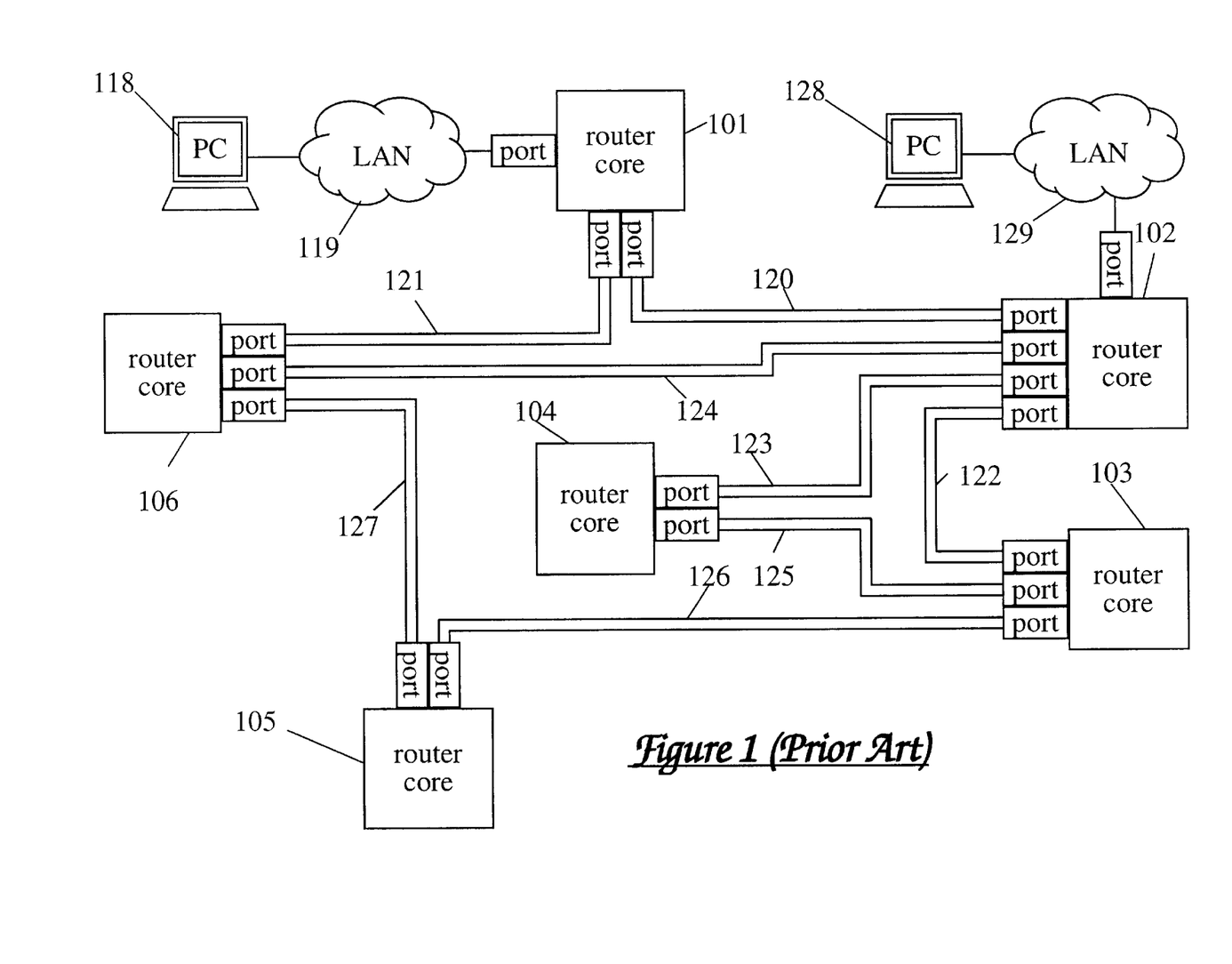
FIG. 1 illustrates a packet network containing a number of routers interconnected by point to point transmission links.
Figure 2:
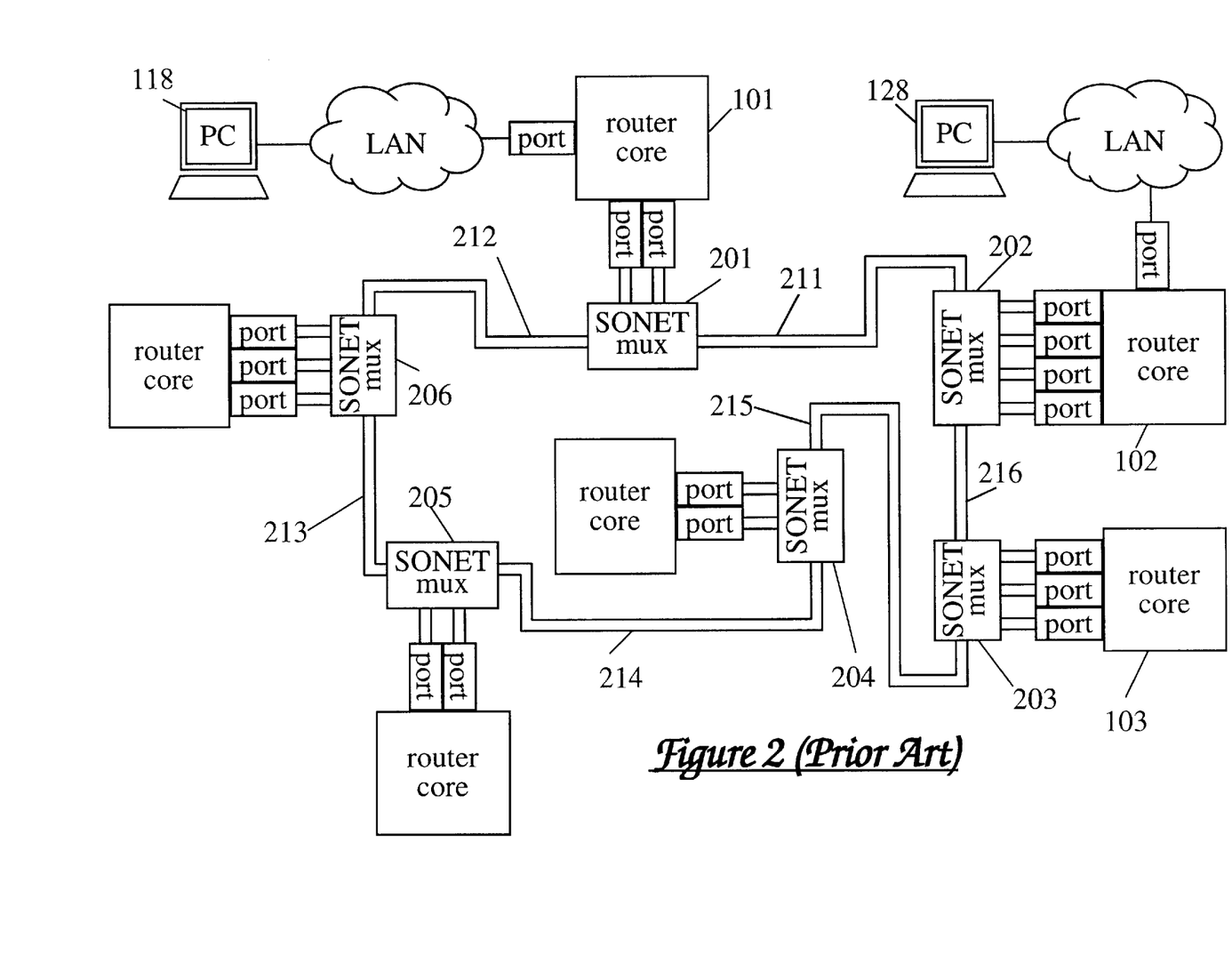
FIG. 2 illustrates a similar network where the routers are interconnected by a SONET ring.

Reference will first be made to FIGS. 1 and 2 of the accompanying drawings, which figures are introduced for explanatory and comparative purposes and as an aid to the fuller understanding of the invention.

Referring first to FIG. 1, this illustrates a data network containing a number of routers 101 to 106. Each router comprises a core and a number of data ports interconnected by point to point transmission links 120 (connecting routers 101 and 102), 121 (connecting routers 101 and 106), 122 (connecting routers 102 and 103), 123, 124, 125, 126 and 127. Additional data ports are required to connect end user equipment (for example, personal computers), in most cases via ports supporting local area network (LAN) protocols such as Ethernet (IEEE Standard 802.3). Two items of end user equipment (PCs) are shown, 118 and 128 connected to routers 101 and 102 via LANs 119 and 129, respectively.

It is assumed for example that PC 118 coupled to router 101 wishes to communicate with PC 128 coupled to router 102. Under normal conditions, and in the absence of network failures, routers 101 to 106 will have built up routing tables listing optimum routes across the network between end equipments. In particular, an entry in the routing tables of router 101 will indicate that the optimum path to PC 128 is via transmission link 120 and router 102. Packets generated by PC 118 and directed to PC 128 will normally take this route. Suppose now that link 120 fails. Routers 101 and 102 will realise from periodic control messages that they can no longer communicate via link 120 and will therefore rebuild their routing tables based on the degraded network topology. Router 101 may now for example direct traffic for PC 128 over link 121 via router 106 which is still able to communicate with router 102 via link 124. Following this reconfiguration, subsequent packets from PC 118 to PC 128 will travel via router 106 using the appropriate interconnecting links. Thus the network is able to recover from internal failures. However, for a large network this reconfiguration process can take many minutes while the routing tables are being re-established, and all traffic attempting to use the affected link will be lost in the meantime.

FIG. 2 shows a network of routers having the same logical connection topology as FIG. 1, but where interconnection between the routers is accomplished using a SONET ring instead of point to point connections. The data rate used on the SONET ring is greater than the data rate of the tributary links to allow multiple tributary circuits to be multiplexed together on the main ring.

As for FIG. 1, let us assume that PC 118 wishes to communicate with PC 128. As before, tables in router 101 will be configured to forward packets for PC 128 to router 102 via the port on router 101 which is logically connected to router 102 via SONET multiplexers 201 and 202 and by fibre connection 211. Suppose now that the fibre connection 211 between multiplexers 201 and 202 is severed. The SONET subsystem will detect the failure of the link using its own internal protocols and reconfigure its internal connectivity such that traffic from router 101 to router 102 now passes the other way round the ring via multiplexers 206, 205, 204 and 203 to 202, and fibre connections 212 to 216 and thence to router 102. This reconfiguration is typically completed within 50 milliseconds. No rediscovery and reconfiguration is required in the routers since the logical connectivity is restored by the SONET subsystem and little traffic is lost. A major disadvantage of this system is that additional capacity (in terms of higher multiplexed data rate) must be provided around the SONET ring to allow for fault traffic traversing the 'wrong' way around the ring. This additional capacity is normally not available for lower priority traffic in the absence of link failure. Furthermore, even if this additional capacity could be used, any failure around the ring may cause protection capacity to be used elsewhere around the ring, thus affecting lower priority traffic between nodes not adjacent to the link failure.

Having described the prior art network operation in order to facilitate a fuller understanding of the invention, a preferred embodiment of the invention will now be described by way of example with reference to FIGS. 3, 4a and 4b of the accompanying drawings.

Figure 3:
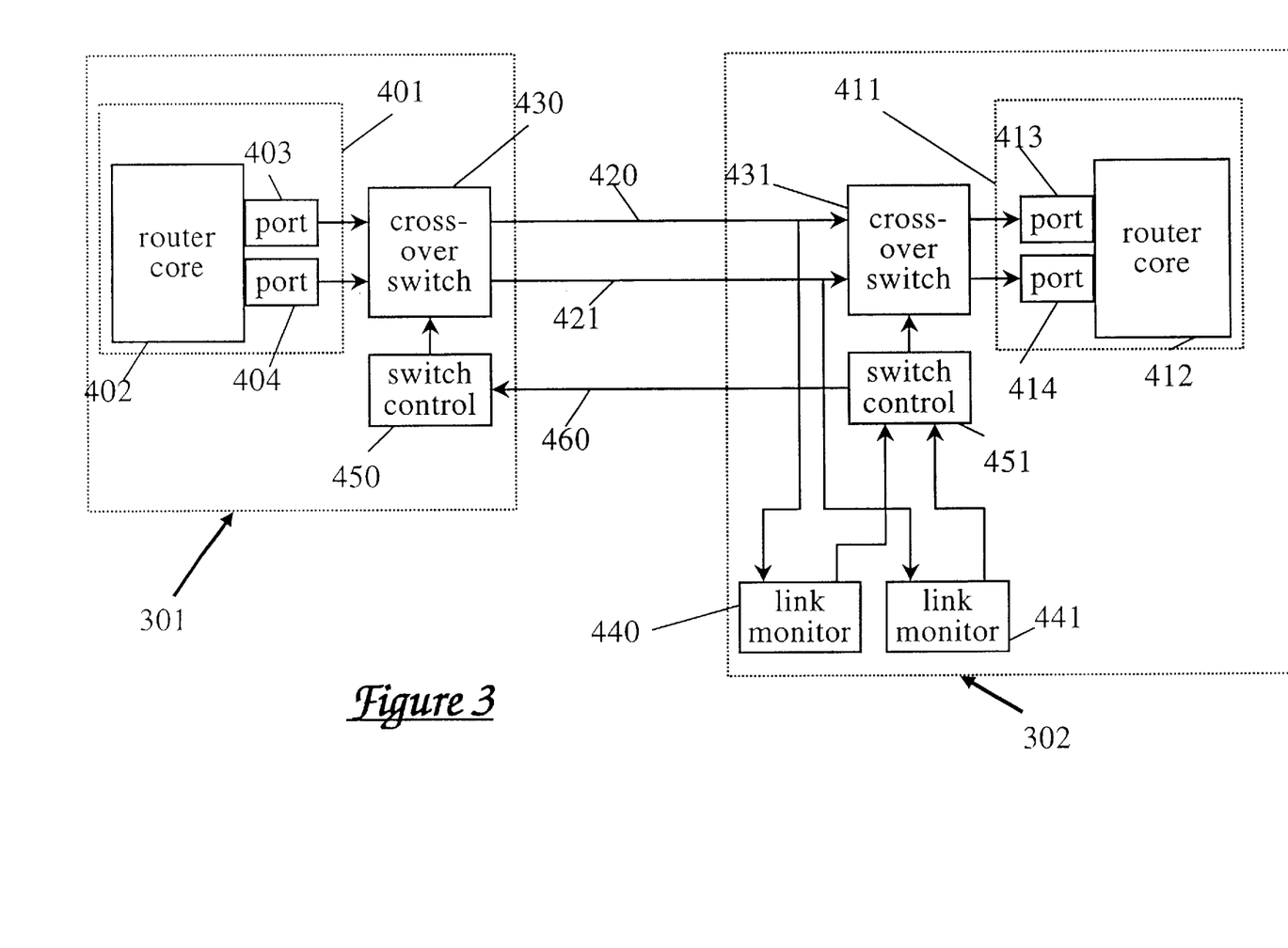
FIG. 3 shows two network nodes interconnected via two optical fibre links and using a protection function according to a preferred embodiment of the invention.

FIG. 3 shows two network nodes generally indicated as 301 and 302 interconnected via two diversely routed optical links 420 and 421. For clarity, only those elements associated with transmission from node 301 to node 302 are shown. A similar duplicate arrangement will be required for transmissions in the return direction from node 302 to node 301. The nodes 301 and 302 handle both high priority traffic and lower priority traffic, the priority class of each packet being determined e.g. from information contained in the packet header. Node 301 includes a router 401 which in turn consists of a router core 402 and a number of access ports, of which two are shown, 403 and 404. Other ports are of course needed to feed traffic from user end systems into the router and to connect to other nodes in the network but in the interests of clarity are not shown on the diagram. Similarly node 302 includes a router 411 comprising a core 412 and access ports of which two are shown, 413 and 414. A crossover switch 430 is interposed between port 403 and communications link 420 and between port 404 and communications link 421. In node 302 a similar cross-over switch 431 is interposed between communications link 420 and router port 413 and between link 421 and port 414. The operational states at the receiving ends of links 420 and 421 are monitored by state monitors 440 and 441, respectively. Information concerning each link state is fed to switch control 451 and, via a signalling link 460, to switch control 450.

In normal operation, i.e. in the absence of link degradation or failure, crossover switch 430 is configured to connect router port 403 to communications link 420 and port 404 to link 421. Similarly, in node 302, crossover switch 431 is configured to connect links 420 and 421 to ports 413 and 414, respectively.

Router 401 is configured to pass all high priority traffic destined for node 302 through router port 403. Best efforts traffic, i.e. lower priority traffic, uses the other port, 404. Optionally, best efforts traffic may also use any spare capacity on the higher priority traffic port 403, if the router possesses this capability.

In the event that degradation or failure of the link 420 carrying the high priority traffic is determined, the following occurs:

Failure or degradation of the link is detected by the transmission status monitor 440 and this information is passed to switch control 451 and, via signalling link 460, to switch control 450. Switch control 450 causes crossover switch 430 to reconfigure such that router port 403 is disconnected from link 420 and instead connected to link 421. Similarly, port 404 carrying the lower priority traffic is disconnected from link 421 and reconnected to link 420. In node 302, switch 431 is also reconfigured such that link 420 now connects to port 414 and link 421 now connects to port 413. Thus port 403 in node 301 is reconnected to port 413 in node 302, but now using link 421 instead of link 420. This switching takes place in the links between the routers rather than in the routers themselves.

Figure 4A:
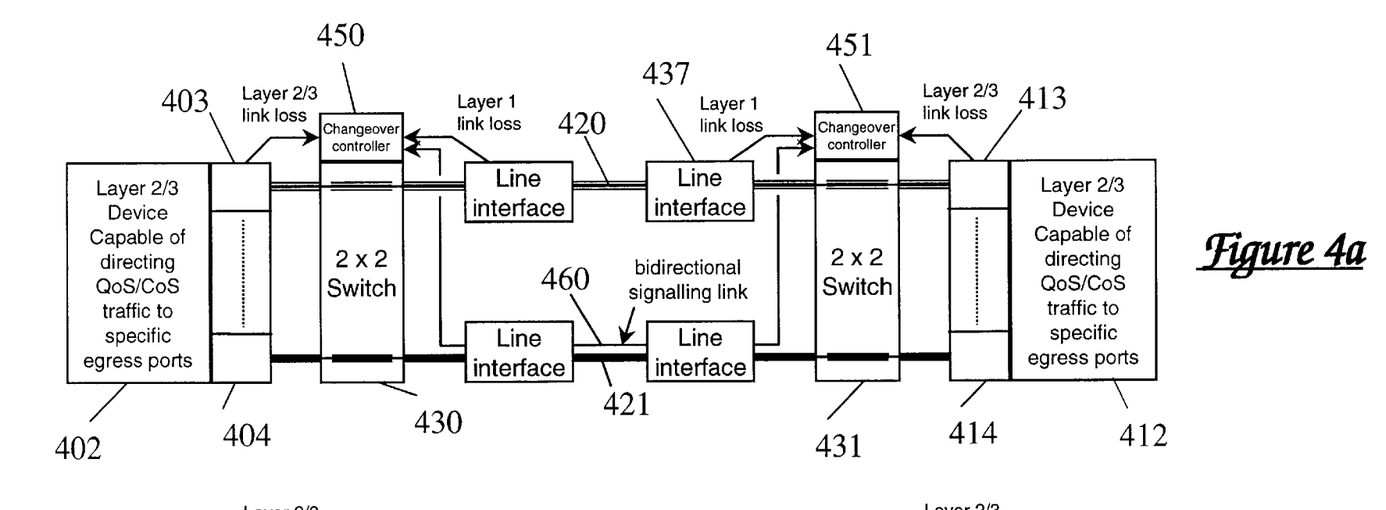
FIGS. 4a and 4b illustrate schematically the mechanism of operation of the protection function of FIG. 3.
Figure 4B:
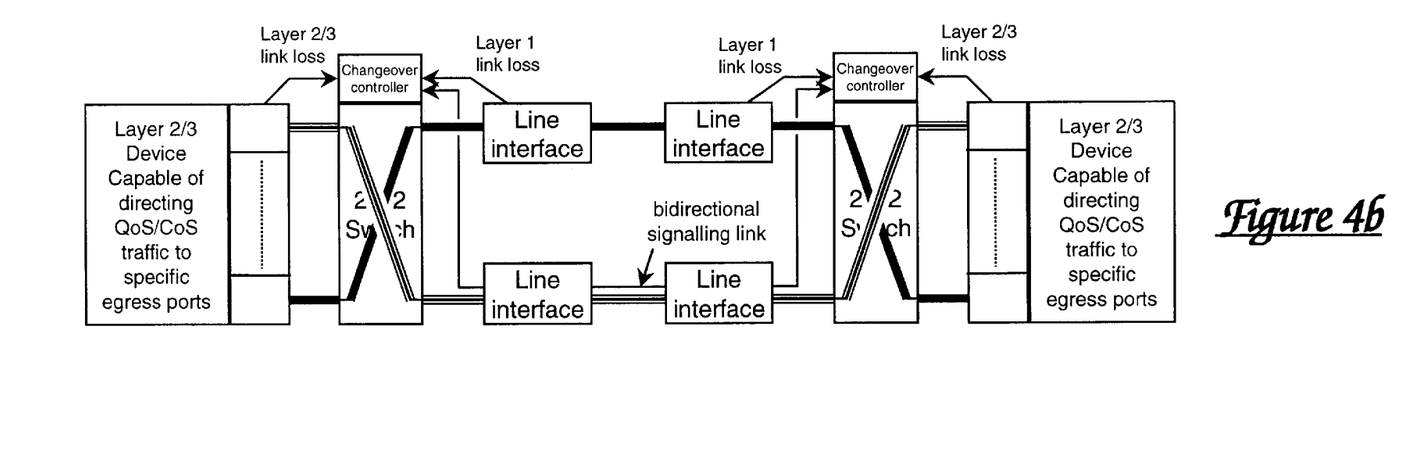

The mechanism of the high priority traffic path protection provided by the arrangement of FIG. 3 is illustrated schematically in FIGS. 4a and 4b. In FIG. 4a, the changeover switches 430 and 431 operated via changeover controllers 450 and 451 are shown in their normal configuration, i.e. in the fault free condition, with the high priority traffic being carried on link 420 and the lower priority traffic being carried on link 421. FIG. 4b shows the switches 430 and 431 in their path protection configuration under a fault condition in which the high priority traffic is diverted to link 421 and the lower priority traffic is diverted, either to be carried over link 420, if this path still has some functionality, or by an alternative route when such a route has been determined at the node 301. Layer 1 link loss may be determined by line interfaces 437. In a preferred embodiment, the line interface 437 incorporates the link monitor function 440 (FIG. 3).

Layer 2/3 link loss may be determined via the traffic ports. As illustrated in FIG. 4a and 4b, each node incorporates a Layer 2/3 device 402, 412, capable of directing QoS/CoS traffic to specific egress ports so as to provide the required traffic segregation.

Because switching is performed in the paths between the nodes, there is no need for either node to be involved in the decision making nor indeed to be aware of any change in the precise route to be taken by the high priority traffic. Thus, whichever of the first and second paths is currently carrying the high priority traffic, the transmitting node 401 continues to output this traffic from the port 403 and the receiving node 411 continues to receive this traffic at the port 413. No switching or rerouting of the high priority traffic is required within the node.

As a result of these actions, the high priority traffic path is restored within a few milliseconds of detection of link degradation or failure, and transmission of high priority traffic is virtually uninterrupted. The best efforts path is now connected through the degraded or failed link 420. If the changeover was initiated as a result of degradation (rather than complete failure) transmission of best efforts traffic between the routers may continue, but with increased probability of packet loss. In the case of severe degradation or complete failure, transmission of best effort traffic will be lost initially. However, as the routers periodically update their internal routing tables, new routes via other routers and transmission paths (not shown in FIG. 3) will be established to convey the displaced best effort traffic to its destination. This latter process will of course take a relatively long time compared to the restoration of high priority traffic, commensurate with the time taken to restore best efforts traffic carried on a failed unprotected link in a conventional system.

Once the link failure has been rectified, the initial connections between the nodes can be restored. Alternatively, to avoid a second (short) traffic interruption, link 421 can be re-designated as the preferred high priority traffic link.

In the event of failure or degradation of the link carrying only best efforts traffic, no switching action is initiated in switches 430 and 431. High priority traffic continues to use the working link and best efforts traffic is restored using router reconfiguration as above.

Note that, since, when making the forwarding decision, many routers do not take account of the source port through which packets arrive, the changeover switch 431 at the receiving end of the link may not be required in all cases.

Link status monitors 440 and 441 can be implemented in a number of ways. For example, to detect total failure, the status monitor could monitor the mean or peak received power or the frequency of signal transitions on the medium. This method of link status monitoring can be made independent of the protocols used on the link.

If it is required also to detect link degradation, other methods can be used alternatively or in addition. For instance, if the optical link uses a block line code (such as the 8B-10B code used by optical links carrying Gigabit Ethernet according to IEEE specification 802.3z), the link status monitor can derive an indication of the bit error rate by checking for code violations in the received signal and can initiate restoring action when the bit error rate exceeds a predetermined value. It must be recognised, however, that such a system is no longer independent of the protocols used for signal transmission.

FIG. 3 shows the link monitors connected directly to the communications links 420 and 421. Instead, or in addition, the link monitors could evaluate information provided by the router ports 413 and 414 or the router core 411 to determine link status. In this latter case, the link monitor or the switch control would need to take account of the state of the crossover switches to identify which link is being monitored by a given link monitor.

FIG. 3 also shows a separate link 460 carrying link status signalling information from node 302 to node 301. In practice, it may be preferable to use return paths associated with links 420 and 421 to carry this signalling information. Since a break in link 420 is likely to be accompanied by a similar break in the associated return path, it is inadvisable to signal the status of link 420 only on its own return path (and similarly for link 421). Accordingly, the status of link 420 would preferably (additionally or instead) be signalled using the return path associated with link 421 (and vice versa for the status of link 421).

In the configuration illustrated in FIGS. 3, 4a and 4b, switches 430 and 431 operate in the optical domain, though the system described in this invention can of course equally be implemented in the electrical domain. In the latter case, transducers associated with impressing the signal on the optical link and detecting the received optical signal are considered to be logically associated with the communications links 420 and 421. Optical switching is however to be preferred as this technique can accommodate the very high bit rates that are being introduced into current and new networks.

In the ISO seven layer model, routers are considered to operate at layer 3, the 'Network' layer. It is also common practice to build data networks where at least some of the packet forwarding is performed at ISO layer 2. The technique described above is equally applicable for implementing resilient communications between nodes based on layer 2 switches rather than routers.

In a further embodiment, the link 420 carrying the high priority traffic may also carry a proportion of lower priority traffic where this link is found to have spare capacity. This can be of advantage to the network operator who wishes to provide path protection of priority traffic, but who also wishes to use the network to its maximum capacity. In the event of a link failure necessitating switching of the high priority traffic to the link 421, any lower priority traffic sharing the port 403 will be switched together with the high priority traffic on to the link 421.

Although the technique has been described with particular reference to a system where two diverse links are provided between nodes, it will be understood that the same principles can be extended to systems where more than two links exist between a given pair of nodes, so long as at least one link carries only best efforts or lower priority traffic during normal operation and can therefore be used as the protecting path for high priority traffic during fault conditions.

It will be understood that the above description of a preferred embodiment is given by way of example only and that various modifications may be made by those skilled in the art without departing from the spirit and scope of the invention.

We claim:

1. A method of transporting packet communications traffic between first and second nodes in a communications packet network carrying high priority traffic and lower priority traffic, said first node having a first output port to which the high priority traffic is permanently allocated and a second output port to which the lower priority traffic is permanently allocated, said first and second output ports being coupled to respective first and second input ports at said second node via a transport medium comprising first and second crossover switches and first and second substantially identical paths therebetween, the method comprising;
- at the first node, identifying the higher and lower priority packets in the traffic, outputting the high priority packets of the traffic at the first output port and outputting the lower priority packets of the traffic at the second output port;
- transporting the high priority traffic via the first crossover switch, the first path and the second crossover switch to the first input port at the second node, transporting the lower priority traffic via the first crossover switch, the second path and the second crossover switch to the second input port at the second node;
- at the second node, receiving the high priority traffic at the first input port and the lower priority traffic at the second input port;
- monitoring the integrity of the first path and, in the event of a fault on that first path, operating said first and second switches so as to transport the high priority traffic on the second path and the lower priority traffic on the first path between the switches.

2. A method as claimed in claim 1, wherein said high priority traffic is identified from information provided in a header associated with each high priority packet.

3. A method as claimed in claim 2, wherein said first path carries both high priority and lower priority traffic.

4. A method as claimed in claim 3, wherein said high priority traffic includes voice traffic.

5. A method as claimed in claim 1, wherein said nodes comprise routers.

6. A method as claimed in claim 1, wherein said nodes comprise Layer 2 switches.

7. A method as claimed in claim 1, and further comprising determining at said first node an alternative route for said lower priority traffic to said second node.

8. An arrangement for providing path protection of high priority traffic in a communications packet network carrying lower priority traffic in addition to said high priority traffic, the arrangement comprising; first and second network nodes, said first node having first and second output ports and said second node having first and second input ports, said first and second output ports being coupled to the respective first and second input ports at said second node via a transport medium comprising first and second crossover switches and first and second substantially identical paths therebetween, wherein said first node identifies the higher and lower priority packets in the traffic, and allocates on a permanent basis the high priority traffic at the first output port and the lower priority traffic to the second output port, the high priority packets in the traffic being transported via the first crossover switch, the first path and the second crossover switch to the first input port at the second node, and the lower priority packets in the traffic being transported via the first crossover switch, the second path and the second crossover switch to the second input port at the second node, wherein the arrangement includes monitoring means for determining the integrity of said first path, and switch operating means responsive to the detection of a fault in said first path by said monitoring means for operating said first and second switches so as to transport the high priority traffic on the second path and the lower priority traffic on the first path between the switches.

9. An arrangement as claimed in claim 8, wherein said switches are controlled via a signalling path provided between said first and second nodes.

10. An arrangement as claimed in claim 9, wherein said signalling path is a bi-directional path.

11. A packet communications network incorporating a path protection arrangement as claimed in claim 10.

* * * * *